United States Patent [19]

Tamamaki et al.

[11] Patent Number: 5,248,318
[45] Date of Patent: Sep. 28, 1993

[54] LAPPING ABRASIVE OF ALUMINA-ZIRCONIA SYSTEM AND METHOD FOR PRODUCING THE SAME

[75] Inventors: Masahiro Tamamaki; Yoshihiro Onoda; Takanobu Takahashi; Koji Tsuda, all of Osaka, Japan

[73] Assignee: Japan Abrasive Co., Ltd., Osaka, Japan

[21] Appl. No.: 773,492

[22] Filed: Oct. 9, 1991

[30] Foreign Application Priority Data

Oct. 9, 1990 [JP] Japan .................................. 2-271168

[51] Int. Cl.$^5$ .............................................. C09C 1/68
[52] U.S. Cl. ........................................ 51/309; 51/293; 51/304
[58] Field of Search .......................... 51/293, 304, 309

[56] References Cited

U.S. PATENT DOCUMENTS

| | | | |
|---|---|---|---|
| 4,666,467 | 5/1987 | Matsumoto et al. | 51/309 |
| 4,770,671 | 9/1988 | Monroe et al. | 51/293 |
| 4,770,672 | 9/1988 | Menard | 51/309 |
| 4,770,673 | 9/1988 | Ketcham et al. | 51/309 |
| 4,867,757 | 9/1989 | Payne | 51/293 |
| 4,881,951 | 11/1989 | Wood et al. | 51/293 |
| 4,959,331 | 9/1990 | Mehrotra et al. | 51/309 |
| 4,960,441 | 10/1990 | Pellow et al. | 51/293 |
| 5,007,943 | 4/1991 | Kelly et al. | 51/309 |

*Primary Examiner*—Mark L. Bell
*Assistant Examiner*—Willie J. Thompson
*Attorney, Agent, or Firm*—Wenderoth, Lind & Ponack

[57] ABSTRACT

Alumina-zirconia lapping abrasives containing tetragonal zirconia at a rate of 30% or less and optionally containing at least one oxide selected from the group consisting of yttrium oxide, calcium oxide, magnesium oxide, titanium oxide and other rare earth oxide in the form of solid solution, which are produced by fusing alumina-zirconia abrasive materials, quenching fused materials to obtain an ingot, crushing the ingot and subjecting the crushed ingot to a heat treatment at a higher temperature than the phase transition temperature of zirconia.

11 Claims, No Drawings

LAPPING ABRASIVE OF ALUMINA-ZIRCONIA SYSTEM AND METHOD FOR PRODUCING THE SAME

BACKGROUND OF THE INVENTION

1. Field of the Invention

This invention relates to a lapping abrasive for polishing or lapping various products made from metal materials, glasses, synthetic resins and so forth, and more particularly to a lapping abrasive suitable for lapping memory hard discs, magnetic heads, photomagnetic discs made by these materials or a magnetic thin-film coated on the photomagnetic discs, and to a method for producing said lapping abrasives.

2. Prior Arts

Conventionally known as lapping abrasives for general metal materials, glasses and synthetic resins are aluminum oxides(alundum and white alundum), silicon carbides(carborundum and green carborundum), boron carbides, cerium oxides, chromium oxides, tin oxides, iron oxides, titanium oxides and diamonds.

These lapping abrasives are finely crushed and classified into a given grain size and an abrasive composition in a slurry form is prepared for a lapping purpose by adding water thereto.

Recently, lapping abrasives have been used for various purposes so that superior processing characteristics have been required. The above mentioned general abrasive compositions, however, have not attained satisfactory results.

Slurries of conventional lapping abrasives prepared by adding water to the above abrasive materials are likely to cause micro-scratches, pin holes(pits) or orange peels on a lapped surface. Orange peels are caused by a defect of the crystal surface induced by various factors which have not been fully clarified. In order to prevent the occurrence of micro-scratches or orange peels, both a high level of skill and considerable time are required to control grinding factors such as the concentration of abrasive grains in an abrasive composition, grinding time or grinding load. Accordingly, it has been difficult to prevent the occurrence of the above deficiencies for both technical and economical reasons.

Lapping abrasives are generally evaluated by the grinding rate, that is, the rate of stock removal in a given time and the surface roughness of the finished work. In case the grinding rate is higher and the surface roughness is closer to the desired roughness, lapping abrasives are valued to be superior.

The grinding rate is improved when abrasive grains of a particle size are used, but the surface roughness becomes more coarse. On the other hand, fine abrasive grains can make the surface roughness fine and easily obtain the desired roughness, but the grinding rate becomes low. Therefore works were conventionally lapped to the desired roughness by first using coarse abrasive grains and then using fine grains with the particle size decreasing gradually. In this case, however, works must be rinsed every time abrasive grains are changed. As a result, the loss of grain is great and the grinding process becomes complicated and takes much time. This is undesirable from the industrial point of view.

In order to solve the above problems, there have been provided some abrasive compositions.

Japanese patent publication No. 53-3518 provides an abrasive composition comprising water, abrasive grains such as aluminum oxide, cerium oxide etc. and 0.1-15 wt% of acidic compounds such as polyaluminum chloride, aluminum nitrate, aluminum bromide, etc. as grinding accelerator. When said abrasive composition is used for lapping a synthetic resin, the grinding rate is improved and coarse grinding grains are not required. Accordingly a high quality of the ground surface is obtained which is free from grinding defects such as scratches, orange peels etc. There are, however, such defects that pollution problems are caused by waste water which includes strong acids such as nitric acids etc., and, in addition besides such strong acids rust the grinding machine and metallic jigs and further chap the hands of the operator.

Japanese patent publication No. 53-44273 provides an abrasive composition for general metal materials comprising silica sol abrasives and an acidic compound such as hydrogen peroxide, sodium peroxide, sodium perborate etc. said abrasive composition, however, is strongly acidic and Thus the same problems occur as in the case of the above abrasive composition. Besides, silica sol abrasives are lower in hardness than aluminum oxide abrasives, so that the grinding rate is low.

Japanese patent application laid open under No. 53-41886 proposes to use abrasive grains composed of secondary particles of 1–200 $\mu$m which are prepared by bonding primary particles of 0.1–0.5 $\mu$m comprising diamond, cubic boron nitride, aluminum oxide and silicon carbide using a binder, whereby a superior grinding rate and a fine ground surface can be obtained.

But, a complicated process is required to granulate and bond the primary particles to the secondary particles and besides it takes much time to regulate the particle size uniformly.

Japanese patent application laid open under No. 60-108489 teaches a lapping method suitable for grinding the surface of a magnetic medium layer of a memory hard disc comprising first supplying an aqueous slurry of aluminum oxide powders containing such oxides as sodium hypochlorite between the surface of a magnetic medium layer and a grinding pad which are placed in sliding engagement in a relative manner and second supplying a colloidal slurry of aluminum oxide as well as the above aqueous slurry.

Said two-step method, however, takes much time and nevertheless the stock removal rate is not high and the grinding rate is low.

Japanese patent publication No. 64-436 discloses an abrasive composition wherein the above defects are almost solved. Said composition comprises water, aluminum oxide abrasives, i.e. $\alpha$-aluminum oxides obtained by calcining granular boehmite at 1150° C. for 3 hours, and 1-20 wt % of nickel sulfate as grinding accelerator. Said composition is neutral or weakly acidic. A plastic surface, electroless nickel plating surface of a memory hard disc, alumite or aluminum surface can be ground mechanochemically by both a mechanical processing with abrasive grains and chemical etching with a processing fluid containing a grinding accelerator. As a result, a superior ground surface and grinding rate can be obtained. Besides said composition is the neutral or weakly acidic which is poor in oxidative effect, so that the grinding machine and metal jigs are hardly rusted and the operator's hands are hardly chapped. Said composition, however, contains $\alpha$-aluminum oxides alone as abrasive grains, so that fine primary grains must be used in order to obtain a given surface roughness. Thus it is not satisfactory in the grinding efficiency.

SUMMARY OF THE INVENTION

It is therefore an object of the present invention to provide lapping abrasives and an abrasive composition containing said lapping abrasives whereby all the defects and problems of the prior lapping abrasives and abrasive composition are avoided and solved and a high grinding efficiency and high processing quality are obtained.

Another object of the present invention is to provide a method for producing said lapping abrasives.

The present invention is based on the findings that high grinding efficiency and desired surface roughness are easily obtained by subjecting alumina-zirconia abrasives to a heat treatment at a temperature higher than the phase transition temperature of zirconia and obtaining alumina-zirconia abrasives containing a residual tetragonal zirconia of 30% or less.

It is well known that alumina-zirconia abrasives containing 10–60 wt % zirconia are superior in abrasion resistance and fracture resistance. Alumina and zirconia do not form a solid solution. Rapid cooling of fused alumina-zirconia materials provides a microstructure which has a lot of fine cutting edges. Thus there is obtained a ground surface of fine roughness. But the alumina-zirconia abrasives are too high in fracture resistance and the usage is limited to heavy duty grinding or rough grinding. In other words, said alumina-zirconia abrasives are only used as a grinding wheel or a coated abrasive article. Besides coarse grains of #8–#220 particle size which are specified in the Japanese Industrial Standard (JIS R 6111) are only used, while the particle size of lapping abrasives is #800–#10000 and average grain size is 15–1 μm. When used for a lapping purpose, said alumina-zirconia abrasives can not show a self-sharpening property which is one of the advantageous points thereof because the grinding load is low and the tenacity of the grains is too high. Also grinding efficiency is extremely low and many marks are formed on the finished surface. Accordingly, said alumina-zirconia abrasives have not been used for the lapping purpose. We, however, found that abrasive grains suitable for the lapping purpose are obtained when said alumina-zirconia abrasives are subjected to a heat treatment at a temperature higher than the phase transition temperature of zirconia whereby a tetragonal zirconia is retained at a rate of 30% or less.

The zirconia content of the alumina-zirconia abrasives to be used is 10–60 wt % and preferably 35–50 wt % which is a nearly eutectic composition.

It is preferable that at least one oxide selected from the group consisting of yttrium oxide, calcium oxide, magnesium oxide, titanium oxide or other rare earth oxide be contained as stabilizer for zirconia at a rate of 0.05–7 wt % in the total amount thereof.

The reason why the zirconia content is 10–60 wt % is that the alumina-zirconia eutectic composition having a microstructure can be obtained at a rate of 25 vol % or higher.

10 wt % of zirconia content yields 25 vol % of alumina-zirconia eutectic and 75 vol % of primary alumina crystal. 60 wt % of zirconia content yields 70 vol % of alumina-zirconia eutectic and 30 vol % primary zirconia crystal. A higher content of primary alumina or zirconia crystals is not preferred because single crystals of rough crystal structure yields too much and the alumina-zirconia eutectic of microstructure is reduced.

The addition of 0.05–7 wt % of stabilizers increases remarkably the rate of residual tetragonal zirconia in an ingot. In other words, the tetragonal zirconia which can be transformed to the monoclinic zirconia by a heat treatment can be increased. The addition of stabilizers in an amount higher than 7 wt % yields a cubic zirconia which is hardly transformed and the grain strength becomes higher than that of the monoclinic zirconia to be obtained.

The lapping abrasives in accordance with the present invention can be easily obtained by fusing and quenching alumina-zirconia abrasive materials to obtain an ingot, subjecting the crushed ingot to a heat treatment at a temperature higher than the transition temperature of zirconia and thereby retaining a tetragonal zirconia of 30 wt % or less.

The ingot obtained by fusing the alumina-zirconia abrasive materials in an electric arc furnace and cooled rapidly in accordance with the cooling method disclosed in the Japanese patent publication No. 1-48219 which corresponds to U.S. Pat. No. 4,671,917 includes 30–80 wt % of residual tetragonal zirconia in the absence of stabilizers and 70–100 wt % in the presence of stabilizers.

When cooling is not sufficient, the rate of residual tetragonal zirconia becomes lower and primary zirconia or alumina crystals precipitate abundantly and also the crystal size of zirconia and alumina in the eutectic composition becomes larger than 1 μm.

The ingot is crushed into particles having a maximum particle size of 100 μm or below using a crushing device such as ball mill, vibro mill or atrita mill and thereafter the particles are classified so that an average grain size of 0.5–50 μm is obtained. The rate of residual tetragonal zirconia is reduced to 50% by the influence of mechanical impact given by the crushing device. The crushed materials, however, are not usable for the lapping purpose because the grain strength is still too high. Said crushed materials are then annealed in an annealing furnace at a temperature higher than the transition temperature of zirconia, preferably at 650° C.±50° C., whereby alumina-zirconia lapping abrasives having the residual tetragonal zirconia of 30 wt % or below are obtained.

Pure zirconia has phase transition points of about 1100° C. at rising temperature dropping and about 900° C. at temperature whereat the tetragonal zirconia is transformed to the monoclinic zirconia. It has been known that the transition temperature falls slightly due to the influence of other elements included in impurities or optionally introduced. The transition temperature particularly at dropping temperature can be reduced remarkably by adding a stabilizer such as yttrium oxide, calcium oxide, magnesium oxide, titanium oxide or other rare earth oxide to zirconia in the form of solid solution. It is revealed by measuring the thermal expansion rate that the transition temperature falls to about 650° C. Phase transition can be made for a short time by annealing the abrasives at a raised temperature higher than 650° C. But this is not advisable because there is a probability that abrupt expansion occurs in the grain whereby grain fracture is caused. On the contrary, a heat treatment at a temperature extremely lower than 650° C. takes much time and it is not suitable for industrial production.

The above abrasives can be used for a lapping abrasive composition by mixing with acidic compounds and water. For example, high grinding efficiency and high processing quality can be obtained by an abrasive composition comprising 5-50 wt % of the above abrasives and 0.05-20 wt % or preferably 0.1-0.3 wt % of at least one acidic compound selected from the group consisting of acidic sulfate, acidic nitrate or ammonium chloride as a grinding accelerator. As alumina-zirconia abrasives have high grinding efficiency, the amount of the grinding accelerator can be reduced compared with a conventional composition. The acidity of the composition is weak so that a grinding machine or jigs are prevented from rusting and the hands of an operator are not chapped.

The reason why the above abrasives and abrasive composition are superior in grinding efficiency and processing quality is conjectured as follows.

Basing upon a study of the phase transition of zirconia, we have provided a super heavy duty abrasive grain comprising alumina-zirconia and titanium oxide in Japanese patent publication No. 48-35594 and also provided alumina-zirconia-titania abrasives having yttrium oxide or rare earth minerals containing yttrium oxide added thereto in Japanese patent publication No. 2-36152.

The present invention is accomplished by applying the phase transition of zirconia to a lapping abrasive. Namely, the present invention intends to decrease only the grain strength to some degree by transforming tetragonal zirconia again to monoclinic zirconia on account of aging effect by a heat treatment, whereby there are obtained the lapping abrasives which are superior in the grinding efficiency and surface roughness of works.

Tetragonal zirconia contained in the alumina-zirconia abrasives is transformed into monoclinic zirconia by a heat treatment and thereby a volume expansion occurs. As a result pores and cracks are reduced and the grain strength is improved. By continuing further the heat treatment, however, the number of micro cracks is increased and the grain strength is reduced. As an intrusive power is rather weaker than a conventional alumina-zirconia abrasive, there are not caused scratches, pits or orange peels on the ground surface.

On the other hand the microstructure inherent to the alumina-zirconia abrasives is retained without being destroyed and the cutting edges of the fine alumina crystals of 0.1-1 μm are also retained. Besides most of the tetragonal zirconia crystals which are very tough are transformed to monoclinic zirconia crystals and lose the toughness so that the self-sharpening property is fully obtained at a grinding load suitable for a lapping process.

It is preferred that the starting abrasives contain the tetragonal zirconia as much as possible because the rate of transition to the monoclinic zirconia is increased and thereby a number of micro cracks are expected to occur.

The lapping abrasive composition using the lapping abrasives thus obtained is superior in grinding efficiency and there can be obtained a ground surface having a suitable roughness and which is free of scratches, pits and orange peel. The additive amount of acidic compounds used as grinding accelerator is small, so that a grinding machine and jigs do not rust and the hands of an operator are not chapped.

The lapping abrasives can be prepared by fusing, cooling and crushing alumina-zirconia materials in accordance with a normal process and subjecting the crushed materials to a heat treatment at a temperature higher than the transition temperature of zirconia and is thus easy to produce.

EXAMPLES

There were prepared five kinds of alumina-zirconia abrasives in accordance with the present invention as follows. Chemical components are shown in Table 1.
 (A) 25 wt % zirconia content
 (B) 40 wt % zirconia content
 (C) 40 wt % zirconia content and 0.5 wt % yttrium oxide
 (D) 40 wt % zirconia content and 2.0 wt % titanium oxide
 (E) 40 wt % zirconia content and 2.5 wt % in the total amount of yttrium oxide and titanium oxide The abrasive materials were fused in an electric arc furnace and quenched to obtain an ingot. After crushing and classification there were obtained abrasive grains having a grain size of #2000 (average particle size 6.7 μm) and #3000 (average particle size 5.5 μm). The residual amount of tetragonal zirconia was determined by detecting peak integral values of $T(111)$ of tetragonal zirconia, $M(111)$ and $M(\overline{1}11)$ of monoclinic zirconia using a X-ray powder diffraction apparatus and calculated by the formula, $$\frac{T(111)}{T(111) + M(111) + M(\overline{1}11)}$$

Annealing was made in an annealing furnace at 500° C., 650° C., 800° C., 1000° C. and 1200° C. Annealing time was one hour, three hours and 10 hours.

Shown in Table 2 is the residual rate (%) of tetragonal zirconia to zirconia contained in ingots, crushed and classified grains #2000 but not annealed and annealed grains #2000 respectively.

At such a low annealing temperature at 500° C., the residual amount of tetragonal zirconia with three-hour annealing is almost the same as in the absence of annealing and ten-hour annealing shows only a slight reduction of tetragonal zirconia. At 650° C., near the transition temperature, a reduction of the amount appears at one hour annealing and a remarkable reduction appears at three-hour annealing. The rate of reduction varies little with a continuous annealing. There is not so much difference between 650° C. and 800° C. or 1000° C. When the annealing temperature comes to 1200° C., the grains are fractured remarkably at one hour annealing and they can not be used for abrasive grains.

Abrasive compositions were then prepared by adding water to obtain 20 wt % of abrasive content and adding nickel sulfate as abrasive accelerator in different amounts.

Conventional abrasive compositions were prepared by calcining granular boehmites [$Al_2O_3 \cdot H_2O$ or $AlO(OH)$] at 1150° C. for three hours, crushing and classifying them into grains of grain size #2000 (average particle size 6.7 μm) and #3000 (average particle size 5.5 μm), adding water and adding nickel sulfate in different amounts.

Used as ground object was a memory disc consisting of an aluminum ring-shape plate having the outer diameter of 130 mm and an electroless nickel-phosphorus (Ni—P) plating layer formed on both sides having a thickness of 30 μm. Chemical components of the plating layer are 90-92% nickel and 8-10% phosphorus.

Said memory disc was mounted to a double-sided lapping machine and polished for ten minutes with suede polishing pads which were placed in sliding engagement with the plating layers of the disc in a relative manner. During polishing, the abrasive slurry of the present invention or the prior art was supplied between the disc and polishing pads at a rate of 0.1 l/min. with a lapping load of 50 g/cm$^2$.

After polishing, the lapped surface of plating layers were detected to determine whether defects were found. Thickness of the discs were measured to calculate thickness of polished plating layers in order to obtain the stock removal rate. Further the surface roughness was measured to determine whether the roughness desired was obtained.

Table 3 shows the lapping test results. Sample No. 1 using the abrasive aluminum oxide #2000 yields numbers of scratches and orange peels on the electroless Ni—P plating surface. The rate of stock removal is as small as 50 mg.

Samples No. 2 and No. 3 containing nickel sulfate as grinding accelerator shows a little higher stock removal rate. But the surface roughness is almost the same as that of Sample No. 1 whereas the former is indicated to be 95-100 when the latter is indicated to be 100 in the form of an index.

Samples No. 4 and No. 5 using the grain size #3000 shows a finer surface roughness of 60-65, but the stock removal rate is as low as 30-60 mg.

In comparative examples, samples No. 17 and No. 18 use non-annealing grains, No. 19 contains no grinding accelerator, and No. 20 takes a lower annealing temperature. Although grinding properties are improved compared to the prior arts they are still not satisfactory.

Samples Nos. 6-16 obtained in accordance with the present invention provides a high quality of grinding surface which is free from scratches and orange peels. The grain size #2000 which has a higher grinding rate than the prior aluminum oxide grains #3000 shows a good surface roughness of 64-75 and the stock removal rate is as much as 110 mg. Thus the grinding efficiency is high. The additive amount of nickel sulfate as grinding accelerator is as small as 0.1-0.3% so that a grinding machine and jigs do not rust and the hands of an operator are not chapped.

TABLE 1

| Abrasive | Chemical components (wt %) | | | |
|---|---|---|---|---|
| grain | Al$_2$O$_3$ | ZrO$_2$ | Y$_2$O$_3$ | TiO$_2$ |
| A | 74.2 | 25.2 | trace | 0.03 |
| B | 59.0 | 40.5 | trace | 0.12 |
| C | 58.8 | 39.8 | 0.52 | 0.11 |
| D | 57.5 | 39.0 | trace | 2.15 |
| E | 57.0 | 39.5 | 0.50 | 2.12 |

TABLE 2

| Abrasive grains | Ingot | Crushed Classified non-annealing #2000 | Annealed #2000 | | | | | | | |
|---|---|---|---|---|---|---|---|---|---|---|
| | | | 500° C. | | 650° C. | | | 800° C. | 1000° C. | 1200° C. |
| | | | 3 hr | 10 hr | 1 hr | 3 hr | 10 hr | 3 hr | 3 hr | 1 hr |
| A | 42.5 | 31.2 | 31.1 | 28.0 | 19.0 | 17.5 | 17.3 | 17.4 | 17.0 | 7.2* |
| B | 46.5 | 35.5 | 35.2 | 30.4 | 30.5 | 20.0 | 18.5 | 19.4 | 19.0 | 8.0* |
| C | 78.5 | 45.2 | 43.2 | 40.5 | 38.0 | 22.3 | 21.2 | 21.5 | 21.0 | 9.2* |
| D | 70.6 | 40.2 | 39.5 | 36.5 | 31.5 | 21.3 | 19.2 | 20.0 | 19.3 | 8.2* |
| E | 92.0 | 50.3 | 48.2 | 42.5 | 40.0 | 23.5 | 21.5 | 21.8 | 21.5 | 9.5* |

*Remarkable grain fracture is observed.

TABLE 3

| Sample No. | Grain | Heat treatment (°C.) | hrs. | Grain size | Grinding accelerator (wt %) | Stock removal rate (mg/10 min) | Surface defect Cratches | Orange peel | Surface roughness (R) |
|---|---|---|---|---|---|---|---|---|---|
| Prior Arts | | | | | | | | | |
| 1 | aluminum | | | #2000 | 0 | 50 | numerous | numerous | 100 |
| 2 | oxide | | | #2000 | 1 | 90 | a little | a little | 95 |
| 3 | | | | #2000 | 10 | 110 | a little | none | 105 |
| 4 | | | | #3000 | 0 | 30 | numerous | numerous | 65 |
| 5 | | | | #3000 | 10 | 60 | a little | none | 60 |
| Embodiments | | | | | | | | | |
| 6 | A | 650 | 3 | #2000 | 1 | 110 | none | none | 75 |
| 7 | B | 650 | 3 | #2000 | 1 | 120 | none | none | 70 |
| 8 | C | 650 | 3 | #2000 | 1 | 120 | none | none | 70 |
| 9 | D | 650 | 3 | #2000 | 1 | 120 | none | none | 70 |
| 10 | E | 650 | 3 | #2000 | 0.05 | 110 | none | none | 70 |
| 11 | E | 650 | 3 | #2000 | 0.1 | 130 | none | none | 70 |
| 12 | E | 650 | 3 | #2000 | 0.3 | 130 | none | none | 65 |
| 13 | E | 650 | 3 | #2000 | 1 | 120 | none | none | 65 |
| 14 | E | 650 | 3 | #2000 | 20 | 110 | none | none | 70 |
| 15 | E | 650 | 3 | #3000 | 1 | 70 | none | none | 60 |
| 16 | E | 800 | 3 | #2000 | 1 | 120 | none | none | 70 |
| Comparative Examples | | | | | | | | | |
| 17 | A | untreated | | #2000 | 1 | 80 | a little | a little | 90 |
| 18 | E | untreated | | #2000 | 1 | 85 | a little | none | 80 |
| 19 | E | 650 | 3 | #2000 | 0 | 100 | a little | a little | 70 |

TABLE 3-continued

| Sample No. | Grain | Heat treatment (°C.) | Heat treatment hrs. | Grain size | Grinding accelerator (wt %) | Stock removal rate (mg/10 min) | Surface defect Cratches | Surface defect Orange peel | Surface roughness (R) |
| --- | --- | --- | --- | --- | --- | --- | --- | --- | --- |
| 20 | E | 500 | 3 | #2000 | 1 | 80 | a little | a little | 75 |

We claim:

1. Alumina-zirconia lapping abrasives subjected to a heat treatment at a higher temperature than the phase transition temperature of zirconia whereby tetragonal zirconia is retained at a rate of 30% or less.

2. Alumina-zirconia lapping abrasives as claimed in claim 1, wherein zirconia content is in the range of 10-60 wt %.

3. Alumina-zirconia lapping abrasives as claimed in claim 1, wherein the alumina-zirconia abrasives are of near eutectic composition containing zirconia in the range of 35-50 wt %.

4. Alumina-zirconia lapping abrasives as claimed in claim 1, wherein at least one oxide selected from the group consisting of yttrium oxide, calcium oxide, magnesium oxide, titanium oxide and other rare earth oxide is contained in the form of solid solution as stabilizer in the total amount of 0.05-7 wt %.

5. A method for producing alumina-zirconia lapping abrasives comprising fusing alumina-zirconia abrasive materials, quenching fused materials to obtain an ingot, crushing the ingot and subjecting the crushed ingot to a heat treatment at a higher temperature than the phase transition temperature of zirconia whereby tetragonal zirconia is retained at a rate of 30% or less.

6. A method for producing alumina-zirconia lapping abrasives as claimed in claim 5, wherein said heat treatment is executed at 650°±50° C. for 3 to 10 hours.

7. An abrasive composition of neutral or weak acid comprising alumina-zirconia lapping abrasives subjected to a heat treatment at a higher temperature than the phase transition temperature of zirconia whereby tetragonal zirconia is retained at a rate of 30% or less, water and an acidic compound.

8. An abrasive composition as claimed in claim 7, wherein the alumina-zirconia lapping abrasives are contained at a rate of 5-50 wt % and have an average grain size of 0.5-50 μm and a maximum grain size of below 100 μm.

9. An abrasive composition as claimed in claim 7, wherein said acidic compound is acidic sulfate, nitrate or ammonium chloride.

10. An abrasive composition as claimed in claim 7, wherein a concentration of acidic compound is in the range of 0.05-20 wt %.

11. An abrasive composition as claimed in claim 7, wherein a concentration of acidic compound is in the range of 0.1-0.3 wt %.

* * * * *